US00RE39012E

(19) United States
(12) Reissued Patent
Noble et al.

(10) Patent Number: US RE39,012 E
(45) Date of Reissued Patent: Mar. 14, 2006

(54) SNOWMOBILE STEERING SKI

(75) Inventors: James K. Noble, deceased, late of Idaho Falls, ID (US); by Patricia S. Noble, legal representative, Bonneville County, ID (US)

(73) Assignee: Polaris Industries Inc., Medina, MN (US)

(21) Appl. No.: 10/349,736

(22) Filed: Jan. 22, 2003

Related U.S. Patent Documents

Reissue of:
(64) Patent No.: 6,267,392
Issued: Jul. 31, 2001
Appl. No.: 09/481,192
Filed: Jan. 11, 2000

U.S. Applications:
(63) Continuation of application No. 08/902,250, filed on Jul. 29, 1997, now Pat. No. 6,012,728, which is a continuation-in-part of application No. 08/664,808, filed on Jun. 17, 1996, now Pat. No. 5,700,020, which is a continuation of application No. 08/106,344, filed on Aug. 12, 1993, now abandoned.

(51) Int. Cl.
*B62B 17/02* (2006.01)

(52) U.S. Cl. ..... 280/28
(58) Field of Classification Search ..... 140/182; 280/28, 22, 22.1, 21.1, 16, 848, 28.14
See application file for complete search history.

(56) References Cited

U.S. PATENT DOCUMENTS

| | | | | |
|---|---|---|---|---|
| 1,053,876 A | | 2/1913 | Riley et al. | |
| 1,054,673 A | | 3/1913 | Charles | |
| 2,038,077 A | | 4/1936 | Haglund | 208/184 |
| 2,443,348 A | | 6/1948 | Flajole | |
| 2,829,902 A | | 4/1958 | Stocker | |
| 3,252,533 A | | 5/1966 | Aeder et al. | 180/5 |
| 3,372,945 A | | 3/1968 | Salisbury | |
| 3,374,003 A | | 3/1968 | Fulsom | |
| 3,414,279 A | | 12/1968 | Allain | |
| 3,512,195 A | | 5/1970 | Porsche | |
| 3,593,814 A | | 7/1971 | Bauler | 180/5 |
| 3,632,126 A | | 1/1972 | Shorrock | 280/28 |
| 3,635,490 A | | 1/1972 | Demaree et al. | |
| 3,643,978 A | | 2/1972 | Westberg | 280/28 |
| 3,675,939 A | | 7/1972 | Vik | |
| 3,711,109 A | | 1/1973 | Hofbauer | 280/28 |
| 3,732,939 A | | 5/1973 | Samson | 180/5 |
| 3,738,676 A | | 6/1973 | Hand | 280/22 |
| 3,773,343 A | | 11/1973 | Ambrose | 280/28 |
| 3,774,926 A | | 11/1973 | Chase | 280/13 |
| 3,778,074 A | | 12/1973 | Kozlow | 280/28 |
| 3,790,184 A | | 2/1974 | Bandrowski | |
| 3,794,341 A | | 2/1974 | Torok | |
| 3,801,116 A | | 4/1974 | Benner | |
| 3,817,544 A | | 6/1974 | Labelle | |
| 3,857,578 A | * | 12/1974 | Alton | 280/28 |
| 3,861,698 A | | 1/1975 | Greig | |
| 3,877,713 A | | 4/1975 | Mabie et al. | 280/28 |
| 3,942,812 A | | 3/1976 | Kozlow | 280/28 |
| 4,077,639 A | | 3/1978 | Reedy | 280/28 |
| D255,893 S | | 7/1980 | Fritz | |

(Continued)

*Primary Examiner*—Richard M. Camby
(74) *Attorney, Agent, or Firm*—Fredrikson & Byron, P.A.

(57) ABSTRACT

An improved snowmobile steering ski attachable to the steering spindles of a snowmobile and, generally, including a frame, which may be integrally molded as part of the ski, and having multiple protruding keels that emerge from the horizon running surface of the ski proximal the ski's front end and gradually increase in protrusion with respect to the bottom running surface to a point of maximum protrusion at a point on the ski runner near to the steering spindle of the snowmobile is disclosed. The keel then gradually decreases in protrusion from its maximum protrusion to merge back into the bottom surface proximal the rear end of the ski.

11 Claims, 6 Drawing Sheets

U.S. PATENT DOCUMENTS

| | | | | | |
|---|---|---|---|---|---|
| D256,224 | S | | 8/1980 | Fritz | |
| 4,293,968 | A | | 10/1981 | Levine | 9/310 |
| 4,403,785 | A | | 9/1983 | Hottel | |
| 4,595,211 | A | | 6/1986 | Fitzpatrick | 280/28 |
| 4,666,171 | A | | 5/1987 | Sellers | |
| 4,775,161 | A | | 10/1988 | Bridges | 280/6 |
| 4,869,336 | A | | 9/1989 | Nakasaki et al. | |
| 4,919,441 | A | | 4/1990 | Marier et al. | 280/21 |
| 5,040,818 | A | | 8/1991 | Metheny | 280/609 |
| 5,135,249 | A | | 8/1992 | Morris | 280/609 |
| 5,145,195 | A | | 9/1992 | Campbell et al. | 280/28 |
| 5,145,201 | A | | 9/1992 | Metheny | |
| 5,165,709 | A | * | 11/1992 | Jacques | 280/28 |
| 5,222,749 | A | * | 6/1993 | Bergstrom | 280/28 |
| 5,344,168 | A | * | 9/1994 | Olson et al. | 280/28 |
| 5,443,278 | A | * | 8/1995 | Berto | 780/28 |
| D366,014 | S | | 1/1996 | Lindquist et al. | |
| 5,700,020 | A | * | 12/1997 | Noble | 280/58 |
| 5,836,594 | A | * | 11/1998 | Simmons | 280/28 |
| 6,012,728 | A | * | 1/2000 | Noble | 280/28 |
| 6,267,392 | B1 | | 7/2001 | Noble | 280/28 |

* cited by examiner

SNOWMOBILE STEERING SKI

Matter enclosed in heavy brackets [ ] appears in the original patent but forms no part of this reissue specification; matter printed in italics indicates the additions made by reissue.

RELATED APPLICATION

This is a continuation of Ser. No. 08/902,250 filed Jul. 29, 1997 now U.S. Pat. No. 6,012,728 which is a continuation-in-part of U.S. Patent application Ser. No. 08/664,808, filed Jun. 17, 1996 now U.S. Pat. No. 5,700,020 which was a continuation of U.S. Patent application Ser. No. 08/106,344 filed Aug. 12, 1993 now abandoned.

BACKGROUND OF THE INVENTION

1. Field:

This invention relates to snowmobile skis, and more particularly to steering skis for snowmobiles and similar vehicles.

2. State of the Art:

Steering a snowmobile is typically accomplished by a pair of steering skis pivotally attached to the front of the snowmobile. The steering skis glide over the surface of the snow and may be angularly turned from side-to-side in response to movement of a pair of handlebars grasped by a user. The snowmobile generally follows in the direction the skis are pointed.

Under most snow conditions, especially at high speeds, steering skis, when turned, have a tendency to slide sideways, i.e., "plow" forward over the surface of the snow rather than tracking as intended. The turning radius of the snowmobile thus becomes larger than anticipated, and may result in the user hitting something or losing control of the vehicle. If the sliding ski happens to suddenly "catch" in the snow, the momentum of the snowmobile can cause it to overturn and injure the rider. This situation is particularly hazardous under snowmobile-racing circumstances where the snowmobiles are driven at high speed. If a racer does not make a turn as anticipated, or suddenly loses control of his snowmobile, he can cause a high-speed accident, resulting in injury to the racers.

Various methods have been employed to lend increased predictability and control to snowmobile steering skis. One of the more common methods is inclusion of a longitudinal keel along the underside or running surface of the ski. The keel bites into the surface of the snow and enhances steering characteristics, particularly at high speeds.

U.S. Design Patent Des. 366,014 to Lindquist et al. dated Jan. 9, 1996 illustrates a conventional snowmobile ski having a straight central keel. The top surface of the ski has a continuous head along each edge and a plurality of very small, (thin in width and short in depth) straight, longitudinal ribs along the running (bottom) surface of the ski. The nature of a design patent is to illustrate aesthetic (non-functional) features. Thus, the upper beads and lower ribs appear to be non-functional in nature. Further, this design patent was filed about two years after Priority application Ser. No. 08/106,344 filed Aug. 12, 1993, identified herein above as a parent application to the instant application. That parent application illustrates and describes snowmobile skis having functional, multiple curved keels. The cited design patent shows, functionally, only a straight center keel of conventional shape and purpose.

A keel for a snowmobile, steering ski is disclosed in U.S. Pat. No. 3,632,126 to Shorrock. The keel disclosed in Shorrock has a straight running edge, and is adjustable to compensate for wear. U.S. Pat. No. 3,711,109 to Hofbauer discloses a snowmobile steering ski having a very short, curved keel resiliently attached to the ski runner. U.S. Pat. No. 3,643,978 to Westberg discloses a short curved flange which may be attached to the edge of a snowmobile ski, and which is intended to function similar to a keel.

U.S. Pat. Nos. 5,040,818 and 5,145,201 to Metheny illustrate snowmobile skies having a central keel with a planar lower surface as a part of a ski which has a laterally arched lower running surface.

Although the above inventions represent alternatives to a snowmobile ski without a keel, they are subject to several problems. The weight of both the snowmobile and the user is distributed evenly over the flat running surface of the skis in Shorrock, which places a portion of the weight at the ends of the straight keel. This makes the skis difficult to turn and lessens its usefulness. The bite of the keel into the surface of the snow is also distributed over a large area instead of concentrated in the most efficient location directly beneath the steering spindles. The short keel in Hofbauer tends to provide a concentration of weight beneath the steering spindles, but the amount of bite is reduced in soft snow due its short length. Also, because it is hinged, it tends to retract on hard snow pack or on ice, when a keel is very important. The short flange in Westberg also tends to concentrate weight beneath the steering spindles, but since it mounts on the edge of the ski, it actually exacerbates the problem of the ski "catching" in the snow during a turn, causing a loss of control even at moderate speeds. (The phenomenon is similar to the effect of a downhill skier catching a downhill edge during a turn.) Also, such short keels do not provide steering stability during straight runs and show a reduced steering ability in soft snow.

The invention disclosed in Shorrock, Hofbauer and Westberg bring to light what has heretofore been a dilemma with respect to the design of snowmobile steering skis. Increased positive steering brought about by a long keel comes at the expense of ease of steering. Accordingly, a short keel makes the skis easier to steer, but reduces the amount of positive control. There is a need for a snowmobile steering ski that provides improved controllability and positive turning without a concomitant increase in steering difficulty.

BRIEF SUMMARY OF THE INVENTION

The snowmobile steering ski of the present application includes an elongated ski having at least a pair of protruding keels that emerge from the bottom running surface of the ski runner proximal the front end of the ski. At least one keel gradually increases in its depth of protrusion with respect to the bottom running surface of the ski to a maximum protrusion at a point on the ski bottom which is preferably close to the ski connector for connection to the steering spindles of the snowmobile. The keel may then gradually decrease in its protrusion depth to merge substantially back into the bottom running surface proximal the rear end of the ski.

Several significant advantages result from the design of the improved snowmobile steering ski. Positive steering is improved because the keel may be made to extend along substantially the entire length of the bottom running surface of the ski. Further, the maximum bite of the keel into the snow is in the most efficient position substantially directly beneath the steering spindles. The ski is easy to turn, however, because the keel design results in a lesser percentage of snowmobile and user weight being distributed at the ends of the keel.

In a preferred embodiment, both the ski and its protruding keels are curved through their mid-sections, with curves being slightly upward away from the snow surface and with the curvature of the keel having a similar or slightly smaller radius of curvature than that of the ski. A smaller radius of curvature of one or more of the keels causes the ends of the keel to merge substantially into the curved bottom running surface of the ski. However, a ski and keel curved to substantially the same radius of curvature also works well for the purposes of the invention.

In another embodiment, the ski is curved slightly upward through its mid-section and the keel tapers in either direction from a point of maximum protrusion below the steering spindles attachment region of the ski into the bottom surface of the ski. In still another embodiment, the running surface of the ski is flat, i.e. a straight, substantially planar surface, and the keel is curved in a convex shape. In yet another embodiment, the ski runner is flat, i.e. substantially straight in a longitudinal direction, and the keel tapers substantially linearly in either direction from a point of maximum depth below the steering spindles to merge substantially with the bottom surface of the ski near the front and rear of the running surface of the ski.

Several additional advantages result from a steering ski having a slightly curved bottom running surface. The curved ski runner carries the largest percentage of snowmobile and user weight substantially directly under the steering spindles of the snowmobile rather than evenly distributed over the bottom surface of the ski. This produces more positive turning and permits the snowmobile to maneuver faster through a turn without losing steering stability during straight-away runs. The ends of the keel also carry a lesser percentage of weight which makes the ski easier to steer. Keel length, however, may remain long to provide increased positive steering and good tracking during straight runs. Keel penetration into the snow is thus concentrated where it is most effective, and reduced near the ends of the ski to provide easier steering. These advantages exist for a curved ski even if the ski has no keel, although typically a keelless curved ski would be fitted with a wear bar which substantially conformed to the curved running surface of the ski.

A further understanding of the improved snowmobile steering ski may be had from the following detailed description together with reference to the drawings.

DETAILED DESCRIPTION OF THE INVENTION

Figure 1:
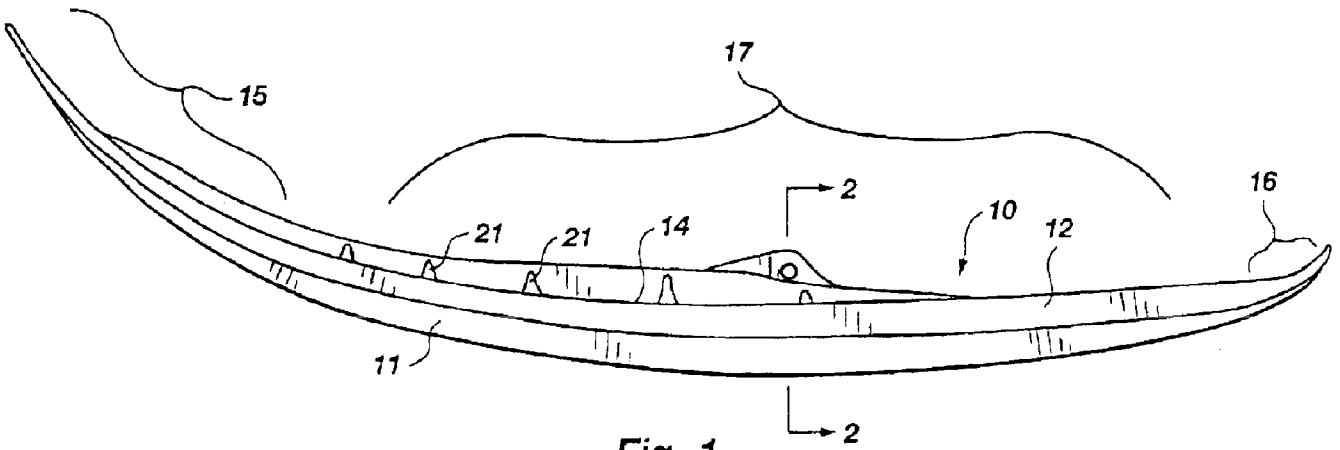
FIG. 1 is a side, elevational view of a longitudinally curved snowmobile ski and a trio of rocker-like keels.
Figure 2:
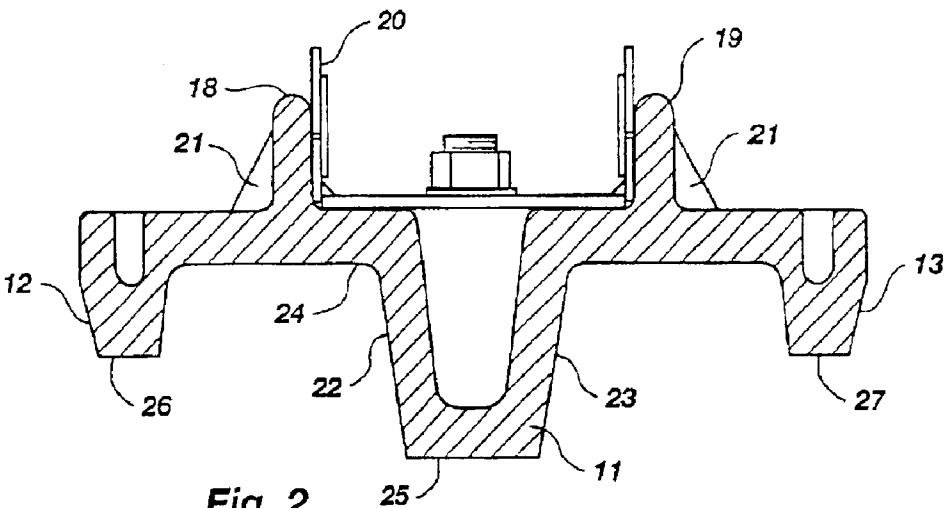
FIG. 2 is a cross-sectional view of the ski of FIG. 1 along section lines 2—2.
Figure 3:
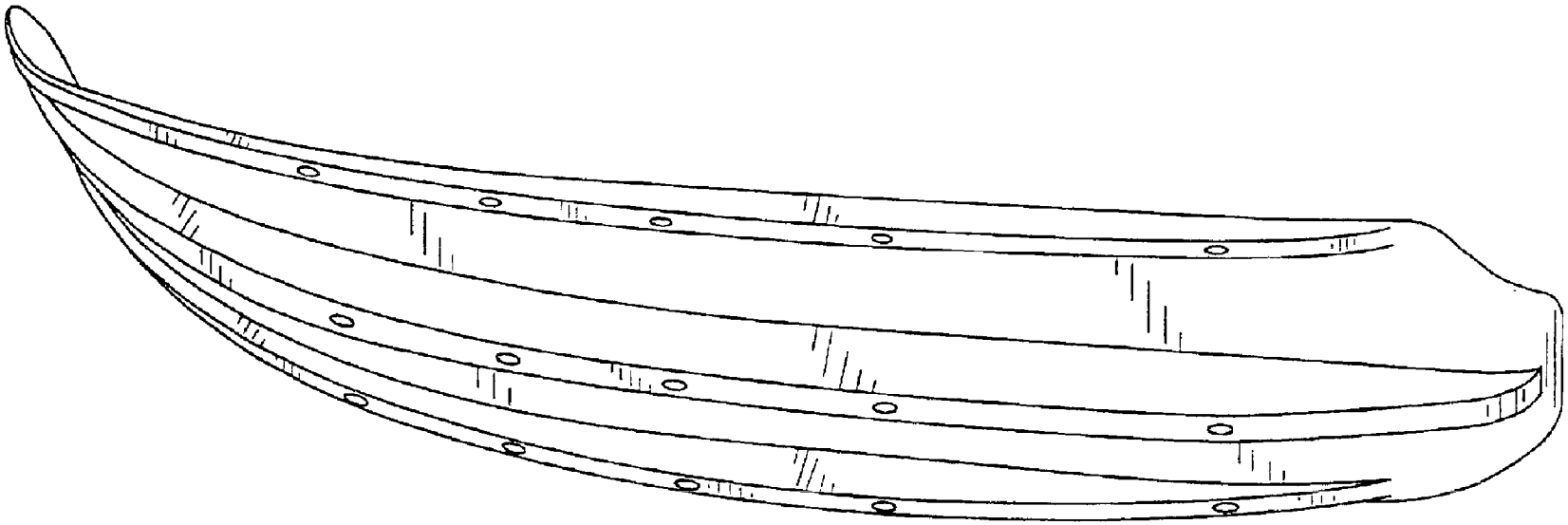
FIG. 3 is a perspective view of the ski bottom of the ski of FIGS. 1 and 2.

A particular embodiment of the invention is illustrated in FIGS. 1, 2 and 3 wherein a snowmobile ski 10, preferably of a one-piece plastic construction, has three depending keels; a central keel 11 located along the central longitudinal axis of the bottom running surface and a pair of outrigger keels 12 and 13 located along each outward edge of the bottom running surface. One, two or all three keels may be independent structures which are attached to the ski by screws, bolts, rivets, glue or the like.

FIG. 1, an elevational, side view, illustrates a curved ski 14 having a generally rocker-shaped appearance. The ski has a tip segment 15 and an aft segment 16 and a central segment 17. The turned up tip segment 14 and the sharply bent aft segment 16 are curved to much shorter radii of curvature than the central segment 17.

On the top surface of the ski a pair of longitudinally oriented reinforcing ribs 18 and 19 strengthen at least the mid-portion and forward portion of the ski, which in FIG. 1 is most of the central segment 17 and tip segment 15 of the ski. A metal bracket 20 is affixed between the ribs (see FIG. 2) for attachment to a steering mechanism (steering spindles) of a snowmobile. The ribs 18 and 19 have a plurality of spaced fillets 21 laterally bracing the ribs to provide additional structural support.

The particular ski shown in FIG. 1, in a preferred embodiment provides a one-piece structure, preferably of molded plastic, which is both strong and flexible while providing the unique advantages of a curved ski running surface and a curved, deep central keel with its excellent turning capabilities. A pair of outrigger keels provide stability and tracking capabilities.

The central keel 11 is generally curved to about the same or a shorter radius of curvature than the central segment 17 of the ski running surface. The central keel 11 runs substantially the whole length of the ski, merging into the running surface near the forward extremity of the tip 15 of the ski and into the aft bottom surface near its terminus. The keel as desired may also protrude from the entire undersurface of the ski tip 15 and aft segment 16.

The left outrigger keel 12 is shown in FIG. 1. The outrigger keels are generally more shallow in depth than the central keel and are curved, preferably, to a radius of curvature intermediate those of the running surface and the central keel. Thus, the radius of curvature for an outrigger keel preferably will be shorter than the radius of curvature for the ski running surface and longer than the radius of curvature of the central keel in this preferred construction. The outrigger keels may, without loss of functionality, be approximately the same curvature as the ski running surface and/or the central keel. The outrigger keels, particularly if they are of a shallow depth and especially if they are short in length, may have a substantially lower edge with only a slight loss of effectiveness when used in conjunction with a curved central keel.

The outrigger keels preferably form the outer, longitudinal edges of the ski, adding strength and twisting (torsional) resistance to the ski as well as functionally improving the tracking and turning capabilities of the ski, especially when such outrigger keels have curved lower edges.

The outrigger keels 12 and 13 also preferably run substantially the entire length of the ski, gradually merging with the ski's bottom surface at the tip and aft end of the ski. However, the outrigger keels may be slightly shorter or longer than the central, primary keel.

FIG. 2 illustrates the cross-sectional structure of this unique triple-keeled ski. This view along section lines 2—2 of FIG. 1 show a cross-section of keels near the mid-point of the length of the ski at their maximum depth. The center keel is shown with sloping sides 22 and 23 so that it is wider at its junction 24 with the ski running surface than it is its bottom surface 25. The cross-sectional shape of the central keel 11, or the outrigger keels 12, may, however, be any convenient shape. The central keel has a depth of about one inch to about two inches, preferably from about one inch to about 1½ inches below the ski running surface. The central keel preferably had a width of about one-half inch to about 1¾ inches at its junction with the ski running surface and a width of about ¼ inch to about one inch at its lower surface (snow penetrating surface) 25.

A typical ski has a width of about four to about seven inches. Each outrigger keel has a width of about one-half to about one inch, preferably from about ¾ to inch, at its junction with the ski running surface and a width of about one-fourth to about ⅞ inch at the lower surface 26 or 27. The depth of an outrigger keel is from about one-half to about one inch, preferably from about one-half to ¾ inch, below the ski running surface.

The width of the lower surface of each keel should be sufficient to accommodate and support a wear bar, which is usually a round rod. The lower surface of each keel may contain a slight longitudinal groove into which a wear bar may nest.

The spacing on either side of the central keel to the closest surface of an outrigger keel is preferably from about one to about two inches. This may be expressed as a ratio of available running surface width to ski width as follows:

Least ratio: Approximately 30%

Maximum ratio: Approximately 70%

The maximum ratio contemplates a maximum area of running surface, which would be generally preferred for loose, powder snow, provided than an appropriate width of ski is used. The minimum ratio provides the least running surface, which contemplates that the lower surface widths of the keels are greater with respect to the ski width, which may be a preferred construction for hard-pack, icy conditions. Since skis are not changed for changing conditions, an all-purpose ski is usually preferred, although in some regions of snowmobile country one extreme or the other may be most useful. For example, in the western United States and Canada, more powdery snow may be encountered while in the midwest and east, more icy conditions may have to be dealt with.

FIG. 3 is a perspective view of the ski bottom of the ski illustrated in FIGS. 1 and 2.

Figure 4:
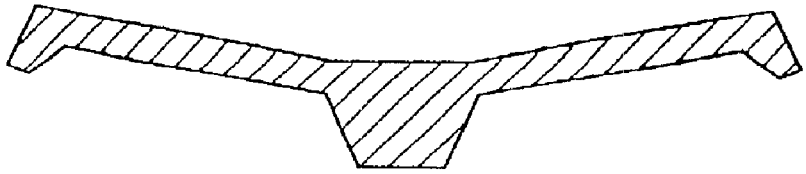
FIGS. 4, 5 and 6 show alternative cross-sectional configurations of a ski having three curved keels.
Figure 5:
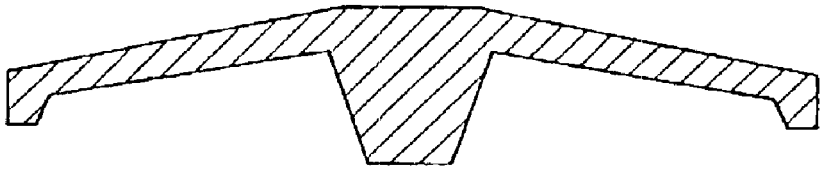
Figure 6:
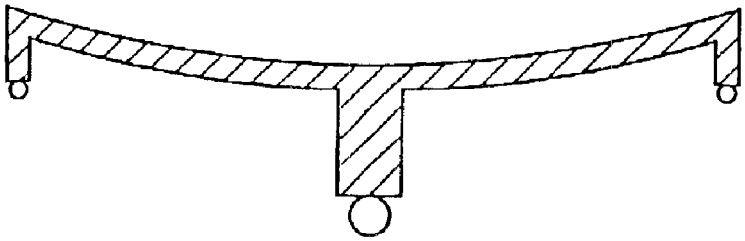

FIGS. 4, 5, and 6 illustrate various cross-sectional configurations for a tri-keeled ski.

FIG. 4 in a lateral cross-sectional view of a tri-keeled ski wherein the central keel 28 has a generally longitudinal rocker-like shape similar to that illustrated in FIG. 1. The bottom running surface of the ski may be longitudinally flat or curved, as in FIG. 1. The running surface, is a lateral cross-section, has a very wide angled V-shape, similar to the wings of a plane, i.e. higher at its tips (outboard edge) than near the central keel. At each outboard edge of the ski is an outrigger keel which projects a short distance down from the running surface of the ski. Each outrigger ski is curved (convex) along its longitudinal length.

The ski illustrated by FIG. 4 is especially useful for steering systems which tilt the ski during turns (camber). The ski of FIG. 4, assuming that one is looking head on at the ski, tends to have the right running surface (surface to the right of the central keel) substantially flat upon the snow during a left turn of the ski. This may, in many instances, be advantageous. Also, the outrigger keel is affixed at approximate right angles to the adjacent running surface of the ski so that during a turn, the outrigger keel on the inside of the turn will be in substantially true vertical orientation with the snow and will present its maximum vertical surface area to the snow to provide maximum "bite."

The design of the ski of FIG. 6 is similar to that of FIG. 4 except that the running surface is curved laterally and the outboard keels are oriented with their vertical axes substantially parallel to the vertical axis of the central keel. The running surface of the ski may be linear or curved in a longitudinal direction. All three illustrated keels are preferably curved. Each keel of the ski of FIG. 6 is shown equipped with a wear bar.

The ski of FIG. 5 has a cross-sectional shape in which outer edges of the ski running surface are lower than at the juncture of the running surface with the base of the central keel. This structure may be advantageous, especially with a ski having a longitudinally curved running surface, since the running surface, laterally drooping to outboard, also tends to dig into the snow during a turn to give a more aggressive bite during a turn. The outboard keels in FIG. 5 are convex as is the central keel. Thus, in a side view, the ski of FIG. 5 would resemble the ski of FIG. 1 with the running surface, central keel and outrigger keels each convexly curved along its length.

As with any tri-keel structure of the instant invention, the outrigger keels are preferably of approximately equal lengths which may be shorter or longer than the central keel. The outrigger keels preferably have identically curved lower surfaces which may be similar or different than the central keel or the running surface of the ski. If skies are made to be a pair, i.e. a right hand and left ski, then the outrigger keels of each ski may be different in length, depth and curvature. Typically, for a "right" or "left" ski that outrigger keel which would be along the inside edge of a ski would have a greater depth, greater degree of curvature, etc. to provide more "bite" during turns if the keels were to be different.

The central keel of a tri-keeled ski preferably has a curved lower surface (which may be approximately by a series of straight, i.e., linear or planar surfaces). The tri-keel configuration is useful for skis having a flat running surface, i.e., planar, or a curved running surface. A curved keel fitted to a curved running surface will have a curvature approximately the same as the running surface or a greater degree of curvature, i.e., a shorter radius of curvature.

The curved surface of a ski or keel may be a regular arc of a circle (or cylinder) or it may be a compound curve or even a "curve" approximated by a series of joined planar or straight (linear) surfaces, e.g., three or more straight line surfaces although two long straight surfaces which meet to form an obtuse (e.g. 150°–170°) included angle may work satisfactorily. However, since keel lower surfaces are generally fitted with wear bars it is generally preferred to avoid "bend" of even "wide" angles since wear will tend to occur there to a greater extent than an other portions of the wear bar. Thus, a relatively smoothly "curved" lower surface for a keel is preferred.

The structure of a curved keel in this invention is such that its greatest depth is preferably near to the point where the ski connects to the steering mechanism of a snowmobile.

The keels described herein generally have a length which is from about 75% to 100% of the running surface of a ski, and, in many structures, the keel may protrude from beneath the tip and turned up aft end of a ski, so that it runs essentially the whole length of the ski.

The outrigger keels generally have a curvature which ranges from linear, i.e., a flat, straight, lower surface useful with flat skis to a curved lower surface, especially at a curvature essentially equivalent to the ski or the central keel. Generally, the depth of an outrigger keel is less than that of the central keel. Generally, the depth of an outrigger keel is less than that of the central keel except when an outrigger keel is the primary keel.

As illustrated in FIGS. 7, 8, 9, 10 and 11 a ski having only a pair of keels (outrigger or in-rigger) which may be especially useful in loose, powdery snow.

Although the skis illustrated and described hereinabove have a central longitudinal keel, a double-keel arrangement without a central keel may also be constructed to employ the structure of the instant invention.

Figure 7:
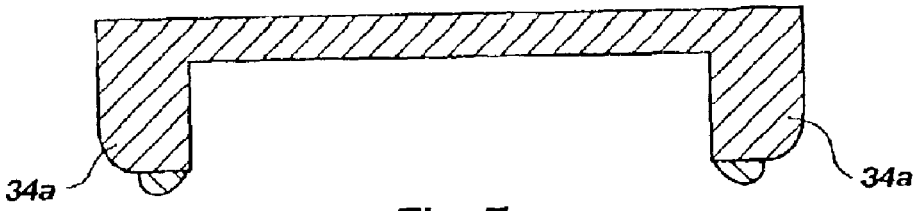
FIGS. 7, 8, 9, 10 and 11 show various cross-sectional configurations of skis having a pair of outrigger, rocker-shaped keels.
Figure 8:
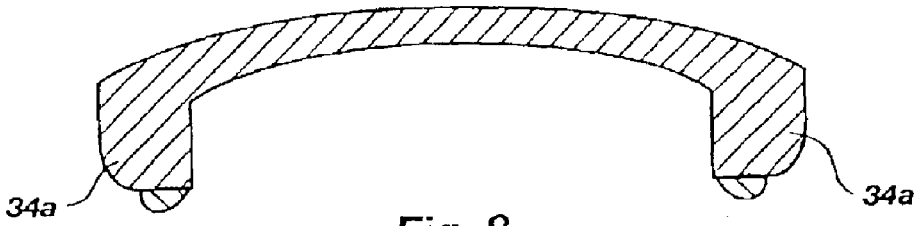

A double-keel ski having a substantially flat running surface and a straight lower-edged keel and having the cross-sectional shape similar to that shown in lateral cross-section in FIGS. 7 and 8 have been developed by inventor, although without being put into commercial use. Skis with dust rocker-like keels of the type described herein as outrigger keels existing on both the inner and outer sides of the steering ski, as shown in FIGS. 7 and 8, do not experience control problems associated with a ski having only a single short, deep outboard keel; a structure suggested in some prior patents.

Figure 9:
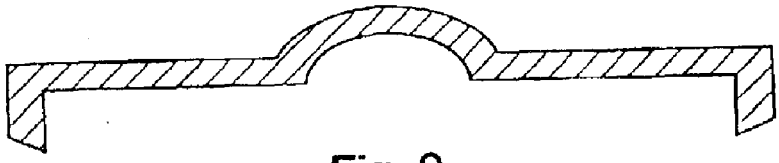
Figure 10:
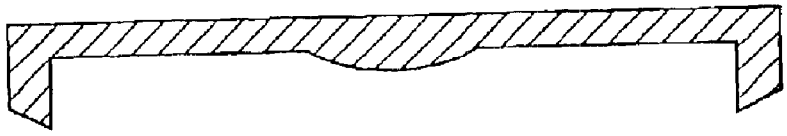
Figure 11:
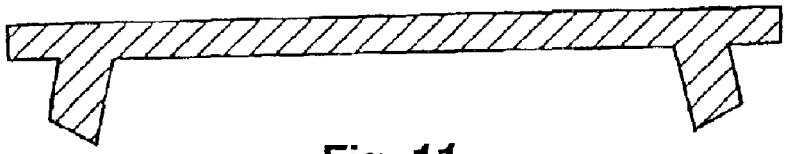

The cross-sectional view of FIGS. 9, 10 and 11 are of various dual keeled skis wherein the running surface may have a slot-like recess (FIG. 9), a longitudinal ridge (FIG. 10) or outrigger keels placed inward of the outboard edge of a ski (FIG. 11).

The structure of the running surface of the ski of FIG. 9 is similar to that of an alpine ski with a longitudinal groove which may help in tracking during straight running. The function of the longitudinal ridge on the lower running surface (FIG. 10) is similar to the groove of FIG. 9.

The structure of the ski of FIG. 11 is such that the keels are placed inboard of the ski's outer edges.

Although skis having substantially flat (straight) running surfaces and dual straight keel edges along their length may be useful, a double-keel or triple-keel configuration wherein the keels are curved in a convex manner, as explained above with regard to skis having a central keel, are preferred and provide excellent turning characteristics, especially when used with a ski which is curved along its central longitudinal axis.

Skis, employing curved double keels, as illustrated in FIGS. 7, 8, 9, 10 and 11, may have flat or curved bottom running surfaces and may be made of metal, plastic or other strong, smooth material. Also, the keels may be an integral part of the ski or they may be attachable or replaceable. The composition (material of construction) of the keels, especially shallow, outrigger keels may be different than that of the ski. For example, one shallow metal keels may be attached in a replaceable manner to plastic skis.

A ski of the instant invention is preferably laterally symmetrical about a vertical plane passing through the ski perpendicularly to its longitudinal axis. It preferable has a keel which is a continuous uninterrupted structure from near its front to near its rear end.

Snowmobile steering skis having keels with a lower curved surface along their length are particularly useful for providing excellent steering control in virtually all snow conditions from deep powder to ice. The curved keel works especially well on skis which have a curved bottom running surface.

The new triple-keeled ski is designed with a central keel that is the dominant steering influence in all ice and snow conditions, and is the only steering control on icy surfaces, since neither of the outer keels make contact on very hard surfaces. But, as surface conditions turn from ice to hard-packed snow, the central keel penetrates the surface deeper and the two outer keels begin to touch the snow and share some of the weight thereby limiting the depth of center keel penetration to prevent an overly aggressive bite. An extremely radical keel depth would normally be dangerously aggressive in firm, hard-packed snow, commonly experienced on frequently used and groomed snowmobiles trails, without the penetration limiting effect of the two outer keels. When the ski is pointed straight ahead, both outer keels are, on the average, level with the snow surface, so both will share the weight of the snowmobile equally. As the ski is steered left or right, the ski surface begins to tilt, due to the camber effect of the snowmobile steering geometry. This action will cause the outer keel nearest the outside radius of the turn to rise transferring more weight to the center keel and the opposite outer keel closest to the inside radius of the turn, thereby utilizing this keel to steer the snowmobile more positively. This situation improves the turning ability of the snowmobile without being dangerously over aggressive. So, in spite of the radical appearance of the center keel, a triple keel ski, even one with a relatively deep center keel is designed to govern its own turning aggressiveness by bringing the outer keels into play as the snow conditions dictate.

Deep snow steering of a tri-keel ski has proven superior to any other ski tested, because of the three keel structure. This advantage is noticed whenever the snow exceeds about three inches in depth, and progressively more apparent as snow depth or penetrability increases. In deep snow conditions, all three keels are functional steering aid at all times. The tri-keel structure improves straight line tracing as well as turning capabilities in deep snow.

It is important to note that, the superior turning and tracking abilities of this ski and its aggressive design could only be used comfortably and safely when combined with the patented curved or rocker-shape of the keels as described in pending parent U.S. application Ser. No. 08/664,808 filed Jun. 17, 1996, now U.S. Pat. No. 5,700,020, the description therein being incorporated herein by reference.

Tri-keeled skis of an aggressive design are most effective and tractable upon incorporation of the curved or rocker-shape of the keels. Any other keel structure compromises, to some extent, the steering ease and safety of the snowmobile during turns.

Figure 12:
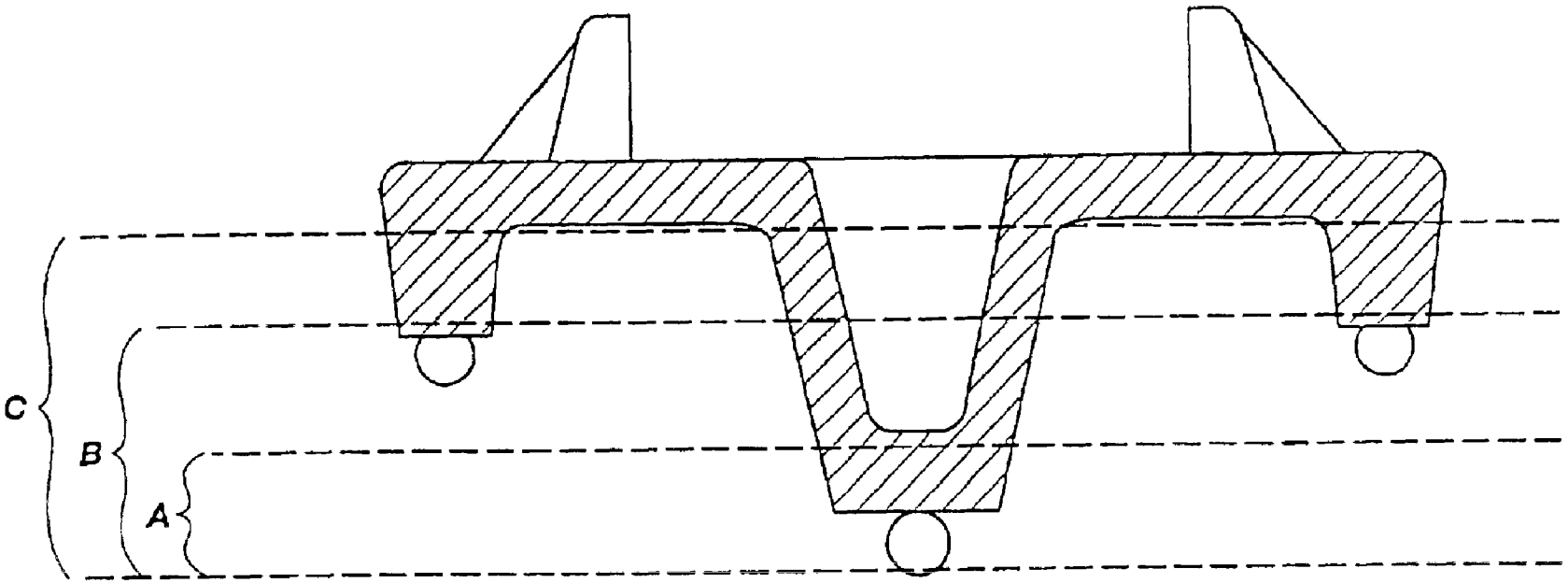
FIG. 12 illustrates a cross-sectional view similar to FIG. 2 wherein the penetration of the keels of the ski into various types of snow conditions is illustrated.

FIG. 12 illustrates the manner in which a preferred tri-keel ski of the instant invention interacts with varying snow conditions. On very hard packed snow or ice, generally on the central (or dominant keel if the central keel is not the dominant keel) will contact the surface. Generally, under such snow conditions only the wear bar and a portion of the dominant keel will penetrate the surface. This is shown in FIG. 12 as condition "A."

On average hard packed or groomed trails, the central keel and the outrigger keels will be in contact with the surface. The deepest keel, shown here as the central keel, will penetrate the surface to a depth that the outrigger keels have made some penetration which typically includes complete penetration by their wear bars and some penetration by the outrigger keel structures (shown as Condition "B").

In soft snow having a depth of three inches or more, all three keels will be substantially totally immersed in the snow and the running surface of the ski between the keels will be contact with the snow and supporting a substantial portion of the forward weight of the snowmobile. In deep, soft snow, the whole ski may sink into the snow until the compaction provided by the ski has "densified" the snow to the point where the condition illustrated as condition "C" exists.

Because most snowmobiles occasionally encounter icy surfaces, it is generally preferred that the dominant keel be the central keel so that uneven stresses on the ski and steering mechanism are not encountered. However, if a keel that is not on the longitudinal centerline of the ski is the dominant keel, then the ski and steering mechanism can be strengthened and reinforced to compensate for such uneven stresses that may occasionally be encountered.

The dominant or primary keel in a dual keel or triple keel structure is deeper than the other keels and is a curved keel. While it is preferred that a multiple keel ski have all keels curved, a ski with a dominant curved keel, which is typically the central keel, may employ subsidiary keels which are very marginally curved or even straight over their entire length when the purpose of such subsidiary keels is to assist primarily the straight line tracking ability of the ski.

Virtually all snowmobiles are designed so that the steering shafts connecting to the front skis are at a forward angle rather than in a vertical orientation. Thus, when the snowmobile steering handle bars are turned, the angle of the steering shafts cause the skis to tilt laterally so that in a left turn, for example, the inside edge of the right ski and the outboard edge of the left ski will be lower than the opposite edge of each ski. The sharper the turn made by the snowmobile, the greater is the degree of tilt of the skis.

The multiple keeled skis of this invention may be structured to maximize the "biting effect" of one or more of the multiple keels.

FIGS. 13–18 illustrate in cross section various alternative structures which employ features of the instant invention, namely, at least one primary (dominant), rocker-shaped keel in conjunction with secondary keels to provide a ski with good, straight tracking ability and excellent turning characteristics in all types of snow depths and conditions. The ski running surface of such skis may be flat or rocker-shaped, with the latter being preferred.

Figure 17:
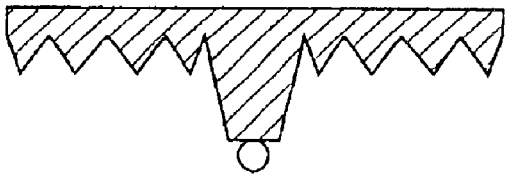

In each embodiment illustrated here secondary keels, which are sufficiently large dimensionally (depth, width and length), function for tracking and turning purposes. All keels illustrated, except the secondary keels in FIG. 17, have sufficient lower (snow-contacting) surface area to accommodate a wear bar. The secondary keel of FIG. 17 are used in conjunction with a dominant central keel, which carries a wear bar, and wherein this ski may be particularly useful in powdery or soft packed snow conditions.

Figure 13:
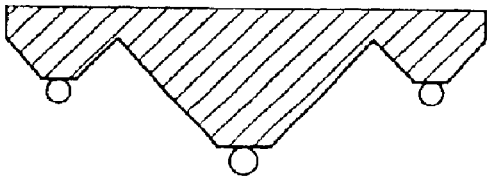
FIGS. 13, 14, 15, 16, 17 and 18 illustrate in cross-sectional view a variety of multiple-keeled skis having at least one primary longitudinally curved keel.
Figure 14:
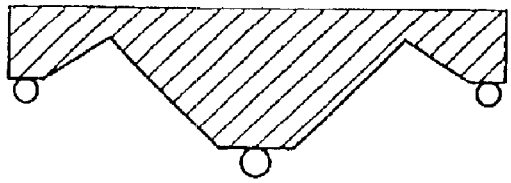
Figure 15:
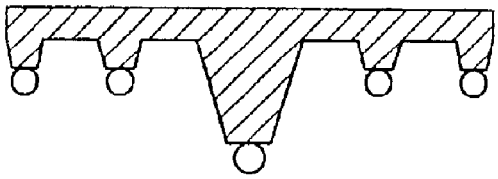
Figure 16:
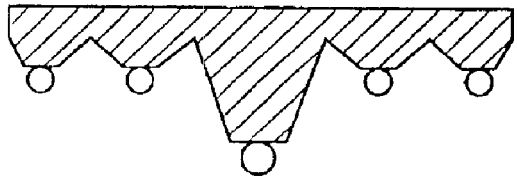
Figure 18:
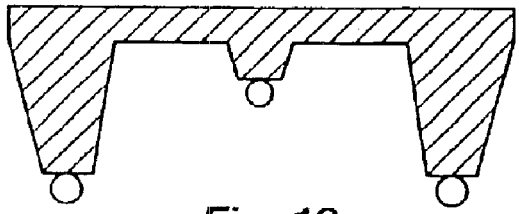

The skids illustrated in FIGS. 13, 14 and 16 are ones in which the lower running surface of the skis are made up of the sloping sidewalls of the skis. FIG. 15 is a ski similar to the ski of FIG. 1 except that the ski of FIG. 15 has five keels, each accommodating a wear bar on its lower snow-contacting surface. The ski of FIG. 18 is one in which the outrigger keels are the dominant keels which the central keel may be straight or curved and function principally to enhance the straight tracking of the ski. Each outrigger keel in FIG. 13 is curved and identical, preferably, to the other outrigger keel.

Although the invention has been described and illustrated herein with a certain degree of particularity of structure, this has been for purposes of illustration of the principles of the invention, and is not intended to limit the invention in any way. It should be understood that various changes and modifications may be made without departing from the spirit and scope of the following claims.

What is claimed is:

[1. A snowmobile steering ski assembly comprising:

a frame for providing structural support to said ski and having attachment means for attachment of said frame to the steering mechanism of a snowmobile; and an elongated ski fixedly attached to said frame and having a curved bottom running surface having a first radius of curvature and structured for gliding over a surface of snow, an upturned front end having a relatively short radius of curvature, a rear end distal from said front end, and three curved protruding keels having a second effective radii of curvature smaller than said first radius of curvature of said bottom running surface, said protruding keels gradually emerging from said bottom running surface proximal said front end and extending along a portion of said length of said ski runner and gradually merging into said bottom running surface proximal said rear end and wherein said keels are molded as a part of said bottom running surface.]

[2. The ski assembly of claim 1, wherein one of said keels is a central keel is located substantially along the longitudinal centerline of said ski and two of said keels are outrigger keels located near each longitudinal edge of said ski.]

[3. The ski assembly of claim 1, wherein said central keel has a maximum depth greater than the maximum depth of either of said outrigger keels.]

[4. The ski assembly of claim 1, wherein each outrigger keel has substantially the same size and shape.]

[5. The ski assembly of claim 1, wherein each keel is adapted to receive a wear bar.]

[6. The ski assembly of claim 2, wherein each outrigger keel is located along each longitudinal edge of said ski.]

7. An improved snowmobile ski for attachment to the steering mechanism of a snowmobile comprising:

[An] *an* elongated member having a turned-up front end and an aft end, wherein said member has:

a bottom running surface extending from the turned up front end to the aft end;

an upper surface having means for attachment directly or indirectly to the steering mechanism of a snowmobile;

a central keel molded as a part of said member and protruding from the bottom running surface of said ski, said keel being substantially the same length as said running surface and having a generally curved shape along its lower edge with its maximum protrusion proximate that portion of the ski which is structured to be below the steering attachment of the snowmobile, said keel protrusion diminishing in both fore and aft directions from said keel's maximum protrusion; and said central keel is located substantially along the center longitudinal axis of said bottom running surface and a pair of shallow-outrigger keels located near the longitudinal edges of said ski.

8. The snowmobile steering ski of claim 7, wherein said bottom running surface of said ski runner is curved upward from said front end to said rear end wherein said curve conforms substantially to an arc of a large radius circle.

9. The snowmobile steering ski of claim 8, wherein said central keel has an effective radius of curvature which is smaller than the radius of curvature of said ski runner.

10. The snowmobile steering ski assembly of claim 1, wherein said frame includes a grab handle structured for grasping by a user.

11. The snowmobile steering ski assembly of claim 7, wherein the protrusion of said central keel gradually increases relative to said bottom running surface of said ski runner from the front end along said length of said ski runner to a maximum protrusion at a point on said ski runner proximal said attachment means of said frame means to said snowmobile steering mechanism, whereupon the protrusion of said keel decreases along said length of said protruding central keel.

12. The snowmobile steering ski assembly of claim 7, wherein said elongated ski is plastic.

13. The improved snowmobile ski of claim 7, wherein said running surface of said ski on either side of said central keel is substantially flat along its length.

14. The improved snowmobile ski of claim 7, wherein said running surface of said ski on either side of said ski is a curved surface approximating a narrow section of a large radius cylindrical surface.

15. The improved snowmobile ski of claim 7, wherein said outrigger keels have a substantially straight lower surface.

16. The improved snowmobile ski of claim 7, wherein said outrigger keels have [s] *a* substantially curved lower surface.

17. A curved plastic snowmobile ski having a front-tip end and an aft with a bottom running surface therebetween, said bottom running surface being an elongated, rocker-shaped surface between said front tip end and said aft end and at least a pair of protruding keels molded into said rocker-shaped bottom surface, said keels having an elongated, rocker-shaped bottom surface curved to a radius of curvature significantly less than the radius of curvature for said bottom running surface.

* * * * *